(12) United States Patent
Chen et al.

(10) Patent No.: US 12,744,730 B2
(45) Date of Patent: Sep. 22, 2026

(54) PACKET FORWARDING METHOD AND SYSTEM, STORAGE MEDIUM, AND ELECTRONIC DEVICE

(71) Applicant: ZTE CORPORATION, Guangdong (CN)

(72) Inventors: Ran Chen, Guangdong (CN); Detao Zhao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 290 days.

(21) Appl. No.: 18/549,115

(22) PCT Filed: Mar. 4, 2022

(86) PCT No.: PCT/CN2022/079343
§ 371 (c)(1),
(2) Date: Sep. 5, 2023

(87) PCT Pub. No.: WO2022/184169
PCT Pub. Date: Sep. 9, 2022

(65) Prior Publication Data

US 2024/0154902 A1 May 9, 2024

(30) Foreign Application Priority Data

Mar. 5, 2021 (CN) ......................... 202110247317.5

(51) Int. Cl.
*H04L 45/00* (2022.01)
*H04L 45/50* (2022.01)

(52) U.S. Cl.
CPC .............. *H04L 45/34* (2013.01); *H04L 45/50* (2013.01)

(58) Field of Classification Search
None
See application file for complete search history.

(56) References Cited

U.S. PATENT DOCUMENTS

2018/0198705 A1* 7/2018 Wang ...................... H04L 45/50
2020/0127913 A1* 4/2020 Filsfils ................. H04L 45/741
(Continued)

FOREIGN PATENT DOCUMENTS

CN 110266592 A 9/2019
CN 110830352 A 2/2020
(Continued)

OTHER PUBLICATIONS

Translation of International Search Report for International Application No. PCT/CN2022/079343, dated May 7, 2022, 2 pages.
(Continued)

*Primary Examiner* — Xavier S Wong
(74) *Attorney, Agent, or Firm* — CANTOR COLBURN LLP

(57) ABSTRACT

Provided are a packet forwarding method and system. a source node in a first SR-MPLS domain sends, based on an SR-Policy, a packet to a destination node in a second SR-MPLS domain, wherein an SR-Policy segment list of the packet includes a BSID, so that the packet passes through an SRv6 domain between the first SR-MPLS domain and the second SR-MPLS domain; After receiving the packet, the first border node replaces the BSID with the SRv6-Policy which destination address is the second border node, the second border node forwards the packet based on the SRv6-Policy, and after receiving the packet, the second border node decapsulates the IPv6 header and its extension header according to the behavior indication information in the SR-Policy, perform an MPLS label forwarding table lookup, so as to forward the packet within the second SR-MPLS domain, until the packet is forwarded to the destination node.

13 Claims, 4 Drawing Sheets

(56) References Cited

U.S. PATENT DOCUMENTS

2020/0128469 A1* 4/2020 Akhavain Mohammadi ............... H04L 45/50
2021/0021513 A1* 1/2021 Filsfils .................. H04L 45/741
2023/0137778 A1* 5/2023 Wen ...................... H04L 45/566 709/238

FOREIGN PATENT DOCUMENTS

CN 110912795 A 3/2020
CN 110958181 A 4/2020
CN 111669330 A 9/2020
CN 111713079 A 9/2020

OTHER PUBLICATIONS

Translation of Written Opinion for International Application No. PCT/CN2022/079343, dated May 7, 2022, 4 pages.
Agrawal, S. E. et al, "SRv6 and MPLS interworking" IETF: draft-agrawal-spring-srv6-mpls-interworking-05, Feb. 22, 2021, sections 2-6, 42 pages.
Chinese Search Report for Application No. 2021102473175, dated Mar. 26, 2026, 3 pages with translation.
Chinese Search Report for Application No. 2021102473175, dated Jun. 26, 2026, 4 pages with translation.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |     Flags     |   Reserved    |
+-+-+-+-+-+-+-+-+-+-+-+-+-+-+-+-+-+-+-+-+-+-+-+-+-+-+-+-+-+-+-+-+
|                 IPv6 Node Address (16 octets)                 |
+-+-+-+-+-+-+-+-+-+-+-+-+-+-+-+-+-+-+-+-+-+-+-+-+-+-+-+-+-+-+-+-+
```

PACKET FORWARDING METHOD AND SYSTEM, STORAGE MEDIUM, AND ELECTRONIC DEVICE

CROSS-REFERENCE TO RELATED APPLICATION

The disclosure is a 35 U.S.C. § 371 National Stage patent application of PCT/CN2022/079343, filed on 4 Mar. 2022, which is based upon and claims priority to Chinese Patent Application CN202110247317.5, filed to the China National Intellectual Property Administration on Mar. 5, 2021 and entitled "Packet Forwarding Method and System, Storage Medium, and Electronic Device", the disclosure of which is hereby incorporated by reference in its entirety.

TECHNICAL FIELD

Embodiments of the present disclosure relate to the field of communications, and in particular, to a packet forwarding method and system, a storage medium, and an electronic apparatus.

BACKGROUND

Since the SR-MPLS (Segment Routing Multi-Protocol Label Switching) has the advantages of source routing and using the existing MPLS data plane, etc., the current network already supports the SR-MPLS, and the incremental deployment of SRv6 (Segment Routing over IPv6) into existing networks require SRv6 to interwork and co-exist with SR-MPLS. FIG. 1 shows an SR-MPLS over SRv6 scenario in an SR-MPLS and SRv6 interworking scenario, where R1, R2 and R3 belong to an SR-MPLS network, R3, R4 and R5 belong to an SRv6 network, R5, R6 and R7 belong to an SR-MPLS network, R3 and R5 are border nodes and belong to both an SR-MPLS network and an SRv6 network, However, for the nodes in the SR-MPLS network and the SRv6 network, when the data packets are forwarded from the border nodes in the SRv6 domain and the MPLS domain to the nodes in the MPLS domain, at present, there is no protocol and solution for solving how to forward a data packet after it comes out from an R5 node and in which forwarding table to lookup.

SUMMARY

Embodiments of the present disclosure provide a packet forwarding method and system, a storage medium and an electronic device, so as to at least solve the problem in the related art of how to forward a data packet when the data packet is forwarded to a node in an MPLS domain from a border node between an SRv6 domain and an MPLS domain.

According to an embodiment of the present disclosure, a packet forwarding method is provided. The method includes: a source node in a first SR-MPLS domain sends a packet to a destination node in a second SR-MPLS domain based on an SR-Policy, wherein an SR-Policy segment list of the packet comprises a BSID (Binding Segment ID) in an MPLS label form, so that the packet passes through an SRv6 domain located between the first SR-MPLS domain and the second SR-MPLS domain; after receiving the packet, a first border node replaces a BSID in an MPLS label form with an SRv6-Policy which destination address is a second border node, and forwards the packet based on the SRv6-Policy, wherein the first border node is a border node between the first SR-MPLS domain and the SRv6 domain, and the second border node is a border node between the SRv6 domain and the second SR-MPLS domain; after receiving the packet, the second border node decapsulates the IPv6 header and the extension header of the packet according to the behavior indication information carried in the SR-policy, perform lookup in the MPLS label forwarding table according to the MPLS label, so as to forward the packet in the second SR-MPLS domain until the packet is forwarded to the destination node.

In an exemplary embodiment, before a source node sends the packet to a destination node based on the SR-Policy, the method further comprises: a controller sends an SR-Policy which destination address is the destination node of a second SR-MPLS domain to the source node, wherein the SR-Policy includes an SR-Policy segment list for reaching the destination node.

In an exemplary embodiment, before the source node sends the packet to the destination node based on the SR Policy information, the controller sends the SRv6-Policy which destination address is the second border node to the first border node, The SRv6-Policy includes the SRv6-Policy segment list for reaching the second border node and the behavior indication information End. DM SID of the second border node, the behavior indication information End. DM SID of the second border node indicates that an IPv6 header and an extension header of the IPv6 header are decapsulated, and perform the MPLS label forwarding table lookup according to the MPLS label to forward the packet.

In an exemplary embodiment, the first border node replacing the BSID in the MPLS label form with the SRv6 Policy which destination address is the second border node comprises: when the packet hits the MPLS BSID table entry, the first border node encapsulates the packet with an IPv6 header and an SRH header, and places the End. DM SID in the SRH (Segment Routing Header) at the last hop.

In an exemplary embodiment, after receiving the packet, the step that the second border node decapsulates the IPv6 header and the extension header of the packet includes: after receiving the packet, the second border node found that the destination address of the packet is itself and needs to execute the behavior indicated by the behavior indication information, the second border node decapsulates the IPv6 header and the extension header of the second border node according to the behavior indicated by the behavior indication information End. DM SID, perform the MPLS label forwarding table lookup to forward the packet according to the MPLS label.

In an exemplary embodiment, the behavior indication information is a Sub-TLV (Type-Length-Value) defined in an SR-Policy tunnel attribute, type length value: End. DM SID Sub-TLV, wherein the End. DM SID Sub-TLV is used for identifying a forwarding behavior of a node, and when a specific node sends a BGP SRv6 Policy to the node, the End. DM SID sub-TLV is extended, and this field carries the End. DM SID sub-TLV of the SRv6 Policy destination node; when the SRv6 Policy carries the BSID in the MPLS label form, the End. DM SID Sub-TLV is also carried.

In an exemplary embodiment, when the controller delivers the SRv6-Policy which destination address is the second border node to the first border node, the End. DM SID Sub-TLV identifying the forwarding behavior of the second border node is carried.

In an exemplary embodiment, the method further comprises: when the controller sends to the first border node the SRv6-Policy which destination address is the second border node, when the SRv6 Policy carries the BSID in the MPLS label form, the End. DM SID Sub-TLV is also carried.

In an exemplary embodiment, the method further comprises: after the first border node receives the issued SRv6 Policy, if there are the BSID in the MPLS label form and the End. DM SID Sub-TLV, then stores the End. DM SID Sub-TLV in the table entry of the MPLS BSID.

According to another embodiment of the present disclosure, a packet forwarding system is provided. The system includes: a source node in a first SR-MPLS domain, a destination node in a second SR-MPLS domain, a first border node between the first SR-MPLS domain and an SRv6 domain, and a second border node between the SRv6 domain and a second SR-MPLS domain, wherein the source node is configured to send a packet to the destination node based on an SR-Policy, wherein an SR-Policy segment list of the packet includes the BSID with an MPLS label form, so that the packet passes through an SRv6 domain between the first SR-MPLS domain and the second SR-MPLS domain; the first border node is configured to, after receiving the packet, replace the BSID in the MPLS label form with an SRv6-Policy which destination address is the border node between the SRv6 domain and the second SR-MPLS domain, and forward the packet based on the SRv6-Policy; the second border node is configured to, after receiving the packet, decapsulate an IPv6 header of the packet to obtain an MPLS label according to the behavior indication information carried in the SR-policy, and forward the packet to the destination node according to the MPLS label.

In an exemplary embodiment, the system further comprises: a controller, configured to sends to the source node an SR-Policy which destination address is a destination node of a second SR-MPLS domain, wherein the SR-Policy includes a SR-Policy segment list for reaching the destination node.

In an exemplary embodiment, the controller is further configured to issue the SRv6-Policy which destination address is the second border node to the first border node, the SRv6-Policy includes the SRv6-Policy segment list for reaching the second border node and the behavior indication information End. DM SID of the second border node, the behavior indication information End. DM SID of the second border node indicates that an IPv6 header and an extension header of the IPv6 header are decapsulated, and perform the MPLS label forwarding table lookup according to the MPLS label to forward the packet.

In an exemplary embodiment, the first border node is further configured to encapsulate the packet with an IPv6 header and an SRH header and place the End. DM SID in the last hop of the SRH when the packet hits the MPLS BSID table entry.

In an exemplary embodiment, the second border node is further configured to, after receiving the packet, if the destination address of the packet is the second border node itself and the behavior indicated by the behavior indication information needs to be performed, decapsulate the IPv6 header and the extension header thereof according to the behavior indicated by the behavior indication information End. DM SID, and perform the MPLS label forwarding table lookup according to the MPLS label to forward the packet.

According to yet another embodiment of the present disclosure, also provided is a computer readable storage medium. The computer readable storage medium stores a computer program, wherein when the computer program is executed by a processor, the computer program is configured to implement the steps in any one of the method embodiments.

According to yet another embodiment of the present disclosure, also provided is an electronic device, including a memory and a processor, wherein the memory stores a computer program, and the processor is configured to run the computer program so as to execute the steps in any one of the described method embodiments.

By means of the embodiments of the present disclosure, an end-to-end SR Policy is created from a source node to a destination node of an SR-MPLS domain, and a BSID in the form of an MPLS label passes through an SRv6 domain that does not support MPLS, thereby implementing packet forwarding of a packet across the SR-MPLS domain and the SRv6 domain.

DETAILED DESCRIPTION OF THE EMBODIMENTS

Figure 1:
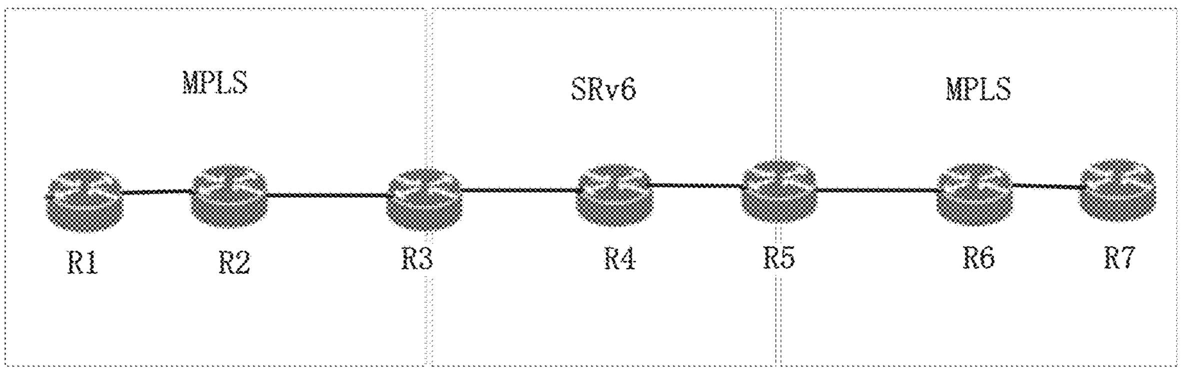
FIG. 1 is a schematic diagram of a scenario where SR-MPLS and SRv6 coexist according to the related art.

Hereinafter, embodiments of the present disclosure will be described in detail with reference to the accompanying drawings and in conjunction with the embodiments.

It should be noted that, terms such as 'first' and 'second' in the specification, claims, and the accompanying drawings of the present disclosure are used to distinguish similar objects, but are not necessarily used to describe a specific sequence or order.

To facilitate understanding of the present disclosure, related terms and technologies involved in the present disclosure are briefly described below.

In network communications, Segment Routing (SR) is a source routing technology. When this technology is used, a forwarding point does not need to perceive a service state, and only needs to maintain topology point information to decouple service instance numbers from a network, thereby greatly improving a capability and extensibility of supporting a ubiquitous connection in the network. The principle of the SR is that the source node pushes an instruction carrying routing information to a packet header, and the intermediate forwarding point pops out related instructions hop by hop for packet forwarding.

The SR technology considers two types of encapsulation in a data plane, one is Multi-Protocol Label Switching (MPLS) encapsulation, mainly using an MPLS data plane, the other is SRv6, using Internet Brief of the case Version 6

(IPv6) encapsulation, and the SR architecture can run on the two data planes. The MPLS forwarding plane can be applied to the SR model without any modification, and the SRv6 technology adds an SRH (Segment Routing Header) to the IPv6 packet to store an SRv6 SID (segment ID) list in a 128-bit IPv6 address format. The 128-bit SRv6 SID is mainly composed of three parts: an LOC field (IPv6 prefix format, routable) for identifying a node location, a FUNC field (local identification) for identifying a service and function, and an ARG field for storing related parameters. A standard SRv6 SID may define path information and service and function information of a specific node.

The SR Policy provides a flexible method for selecting a forwarding path, which satisfies different forwarding requirements of users. When a plurality of paths exist between the source node and the destination node of the SR network, the SR Policy is reasonably used to select a forwarding path, which not only facilitates management and planning of a network by an administrator, but also effectively reduces forwarding pressure of a network device.

In order to support the SR Policy, MP-BGP, a new sub-address family is defined, and SR Policy NLRI (Network Layer Reachability Information), that is, an SR Policy Routing, is newly added. The SR-TE Policy route includes related configuration of the SR Policy, including BSID, color, endpoint, Preference, and Weight. After the device distributes the SR Policy routing to the peer, the peer may also forward the traffic according to the SR Policy.

The device supports adding a Color Extended Community attribute to a BGP route, and after adding a Color Extended Community attribute to the BGP route, if the device receives a packet matching the route, the device searches for an SR Policy having the same Color value according to the Color value in the extended community attribute of the route, so that the device can forward the packet through the SR-TE Policy. If no SR-TE Policy with the same Color value is found, the device forwards the packet through the best route.

Figure 2:
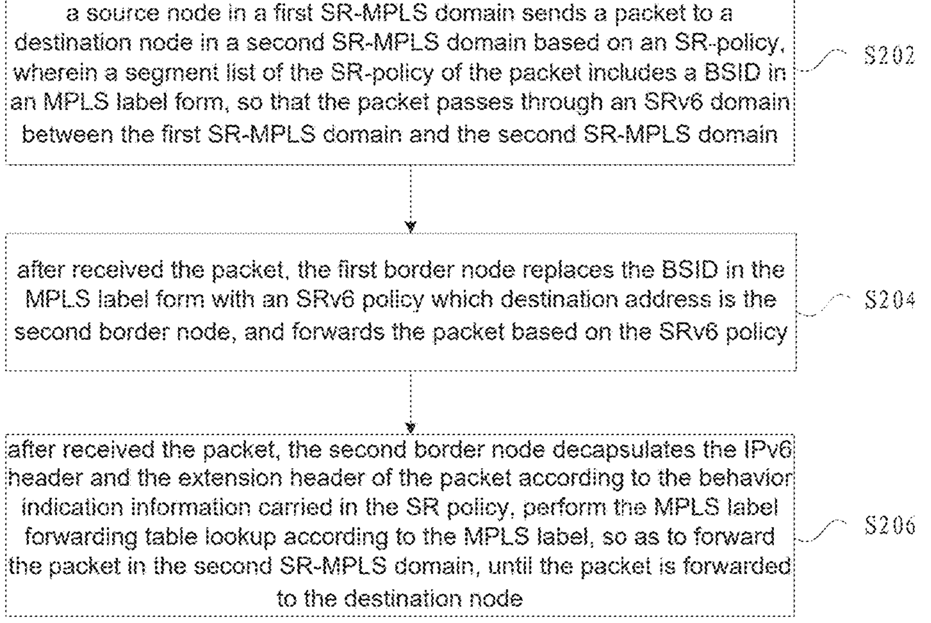
FIG. 2 is a flowchart of a packet forwarding method according to an embodiment of the present disclosure.

With regard to the problem of how an SR domain border node forwards a data packet, an embodiment of the present disclosure provides a packet forwarding method. FIG. 2 is a flowchart of a packet forwarding method according to an embodiment of the present disclosure. As shown in FIG. 2, the flow comprises the following steps:

Step S202, a source node in a first SR-MPLS domain sends a packet to a destination node in a second SR-MPLS domain based on a segment routing policy SR-Policy, wherein an SR-Policy segment list of the packet comprises a BSID in the form of an MPLS label, so that the packet passes through an SRv6 domain located between the first SR-MPLS domain and the second SR-MPLS domain;

Step S204: After receiving the packet, a first border node replaces a BSID in an MPLS label form with an SRv6-Policy which destination address is a second border node, and forwards the packet based on the SRv6-Policy, wherein the first border node is a border node between the first SR-MPLS domain and the SRv6 domain, and the second border node is a border node between the SRv6 domain and the second SR-MPLS domain;

Step S206: after receiving the packet, the second border node decapsulates the IPv6 header and the extension header of the packet according to the behavior indication information carried in the SR-policy, queries the MPLS label forwarding table according to the MPLS label, so as to forward the packet in the second SR-MPLS domain until the packet is forwarded to the destination node.

Before step S202 of this embodiment, the controller delivers an SR-Policy which destination address is the destination node of the second SR-MPLS domain to the source node, where the SR-Policy includes a SR-Policy segment list for reaching the destination node. The controller issues the SRv6-Policy which destination address is the second border node to the first border node, The SRv6-Policy includes the SRv6-Policy segment list for reaching the second border node and the behavior indication information End. DM SID of the second border node, The behavior indication information End. DM SID of the second border node indicates that an IPv6 header and an extension header of the IPv6 header are decapsulated, and perform the MPLS label forwarding table lookup according to the MPLS label to forward the packet.

In step S204 of this embodiment, the first border node replaces the BSID in the MPLS label form with the SRv6 Policy which destination address is the second border node, comprising: when the packet hits the MPLS BSID table entry, the first border node encapsulates the packet with the IPv6 header and the SRH header, and places the End. DM SID in the last hop of the SRH.

In step S206 of this embodiment, after receiving the packet, the second border node decapsulates the IPv6 header and the extension header of the packet, the method comprises: after receiving the packet, the second border node finds out that the destination address of the packet is itself and needs to execute the behavior indicated by the behavior indication information, decapsulating, by the second border node, the IPv6 header and the extension header of the second border node according to the behavior indicated by the behavior indication information End. DM SID, Perform the MPLS label forwarding table lookup to forward the packet according to the MPLS label.

In this embodiment, the behavior indication information is a Sub-TLV: End. DM SID Sub-TLV defined in the attribute of the SR-Policy tunnel, and the End. DM SID Sub-TLV is used for identifying the forwarding behavior of the node; when a specific node sends the BGP SRv6 Policy to the local node, the End. DM SID sub-TLV is extended, and this field carries the End. DM SID Sub-TLV of the destination node of the SRv6 Policy; when the SRv6 Policy carries the BSID in the form of the MPLS label, the End. DM SID Sub-TLV is also carried.

In this embodiment, when the controller delivers the SRv6-Policy which destination address is the second border node to the first border node, the End. DM SID Sub-TLV identifying the forwarding behavior of the second border node is carried.

In this embodiment, when the controller delivers the SRv6-PDU to the first border node with the destination address being the second border node, when the SRv6-PDU carries the BSID in the MPLS label form, the Extended. DM SID Sub-TLV is also carried. After the first border node receives the delivered SRv6 Policy, if the BSID in the MPLS label form and the End. DM SID Sub-TLV exist, the End. DM SID Sub-TLV is stored in the entry item of the MPLS BSID.

Through the description of the foregoing embodiments, a person skilled in the art may clearly understand that the method according to the foregoing embodiments may be implemented by software in addition to a necessary universal hardware platform, and definitely may also be implemented by hardware. However, in many cases, the former is a preferred implementation. Based on such understanding, the technical solutions of the present disclosure essentially or the part contributing to the prior art may be embodied in the form of a software product, the computer software product is stored in a storage medium (such as a ROM/RAM, a magnetic disk, and an optical disk), and includes several instructions for instructing a terminal device (which may be a mobile phone), a computer, a server, a network device, or the like.

The present embodiment further provides a packet forwarding system, which is used to implement the described embodiments and preferred implementation modes, and what has been described will not be elaborated. Although the apparatus described in the following embodiment is preferably implemented by software, implementation of hardware or a combination of software and hardware is also possible and conceived.

Figure 3:
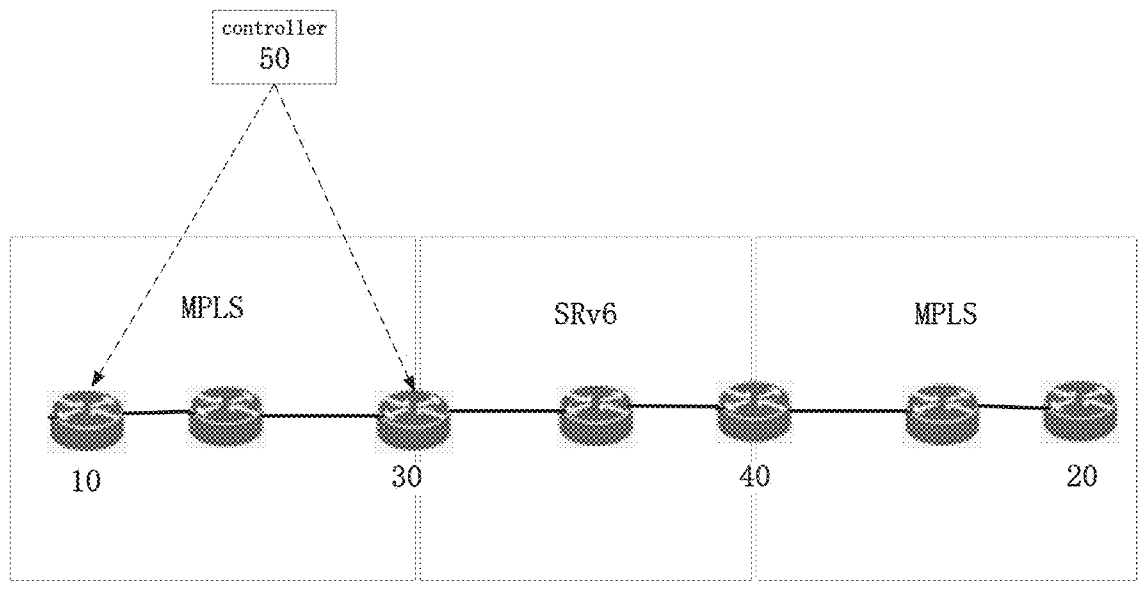
FIG. 3 is a structure diagram of a packet forwarding system according to an embodiment of the present disclosure.

FIG. 3 is a schematic structural diagram of a packet forwarding system according to an embodiment of the present disclosure. As shown in FIG. 3, the system includes a source node 10, a destination node 20, a first border node 30, and a second border node 40.

The source node 10 is in a first SR-MPLS domain, the destination node 20 is in a second SR-MPLS domain, the first border node 30 is a border node between the first SR-MPLS domain and the SRv6 domain, and the second border node is a border node between the SRv6 domain and the second SR-MPLS domain.

The source node 10 is configured to send a packet to the destination node based on a segment routing policy SR-Policy, wherein an SR-Policy segment list of the packet comprises a BSID in an MPLS label form, so that the packet passes through an SRv6 domain located between the first SR-MPLS domain and the second SR-MPLS domain.

the first border node 20 is configured to, after receiving the packet, replace the BSID in the MPLS label form with an SRv6-Policy which destination address is the border node between the SRv6 domain and the second SR-MPLS domain, and forward the packet based on the SRv6-Policy;

the second border node is configured to, after receiving the packet, decapsulate an IPv6 header of the packet to obtain an MPLS label according to the behavior indication information carried in the SR-policy, and forward the packet to the destination node according to the MPLS label.

In this embodiment, the system further includes a controller 50. The controller 50 is configured to deliver an SR-Policy which destination address is a destination node of a second SR-MPLS domain to the source node, where the SR-Policy includes a SR-Policy segment list for reaching the destination node.

The controller 50 is further configured to issue the SRv6-Policy which destination address is the second border node to the first border node, the SRv6-Policy includes the SRv6-Policy segment list for reaching the second border node and the behavior indication information End. DM SID of the second border node, the behavior indication information End. DM SID of the second border node indicates that an IPv6 header and an extension header of the IPv6 header are decapsulated, and perform the MPLS label forwarding table lookup according to the MPLS label to forward the packet.

In an exemplary embodiment, the first border node 30 is further configured to encapsulate the packet with an IPv6 header and an SRH header and place the End. DM SID in the last hop of the SRH when the packet hits the MPLS BSID table entry.

In an exemplary embodiment, the second border node 40 is further configured to, after receiving the packet, if the destination address of the packet is itself and the behavior indicated by the behavior indication information needs to be executed, decapsulate the IPv6 header and the extension header thereof according to the behavior indicated by the behavior indication information End. DM SID, and perform the MPLS label forwarding table lookup according to the MPLS label to forward the packet.

To facilitate understanding of the present disclosure, the following describes the present disclosure with reference to embodiments of specific application scenarios.

Embodiment 1

Figure 4:
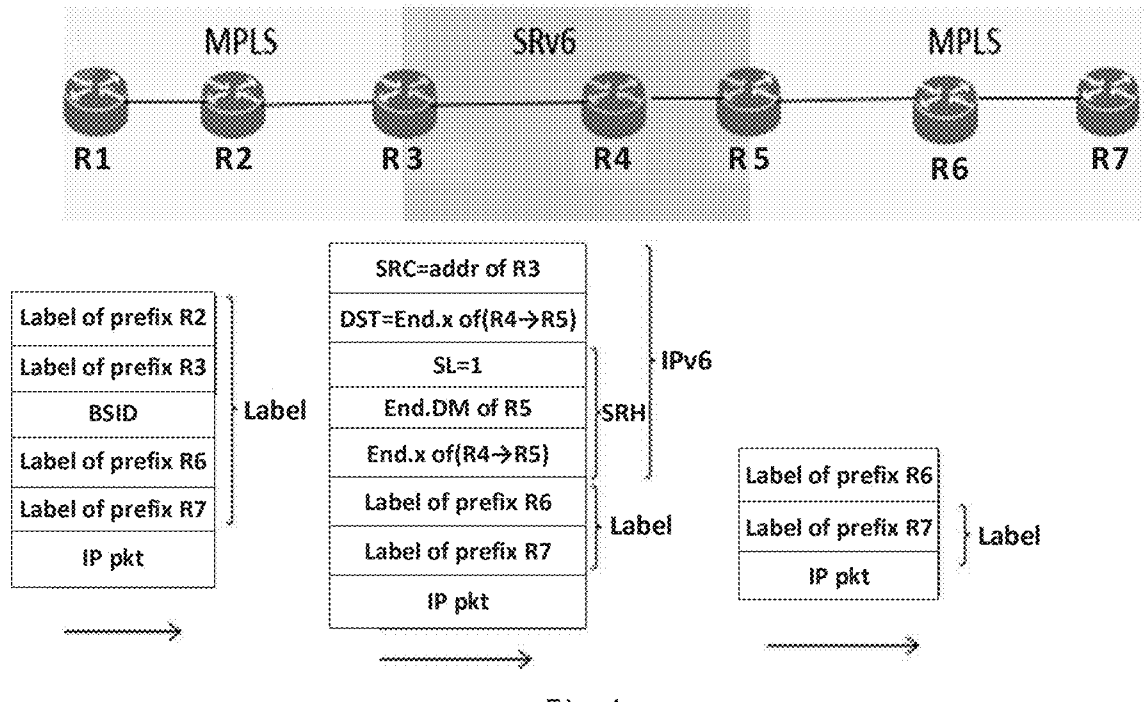
FIG. 4 is a schematic diagram of data packet encapsulation in a packet forwarding process from R1 to R7 according to an embodiment of the present disclosure.
Figure 5:
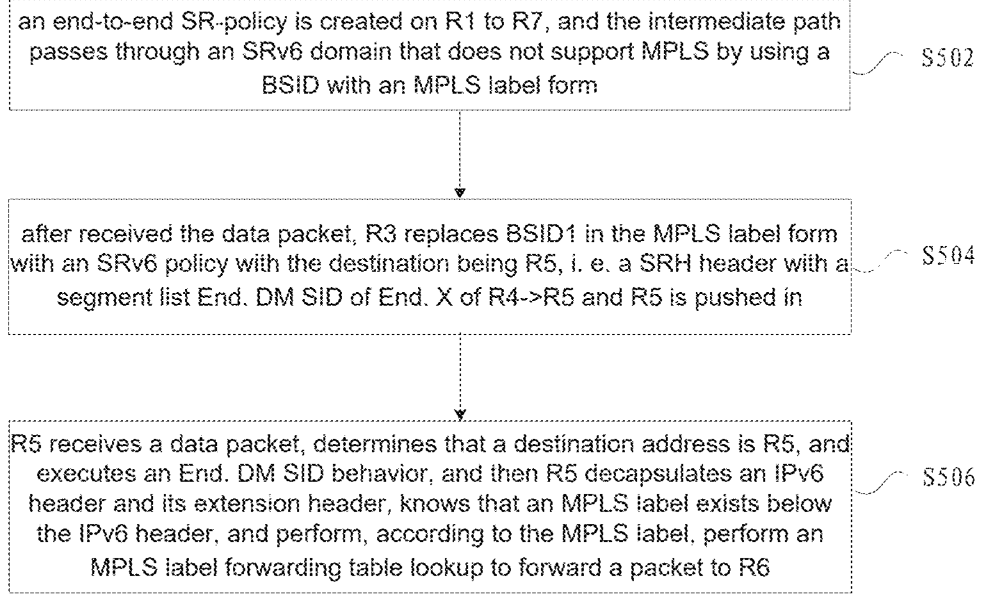
FIG. 5 is a flowchart of packet forwarding from R1 to R7 according to an embodiment of the present disclosure.

This embodiment is described by taking an SR-MPLS over SRv6 scenario as an example. FIG. 4 is a schematic diagram of data packet encapsulation in a process of forwarding a packet from R1 to R7 according to an embodiment of the present disclosure. As shown in FIGS. 4, R1, R2 and R3 belong to the SR-MPLS network, R3, R4 and R5 belong to the SRv6 network, R5, R6 and R7 belong to the SR-MPLS network, R3 and R5 are border nodes and belong to both the SR-MPLS and SRv6 networks. FIG. 5 is a flowchart of a process for forwarding a packet from R1 to R7 according to an embodiment of the present disclosure. As shown in FIG. 5, the packet forwarding in this embodiment comprises the following steps:

Step S502: an end-to-end SR Policy is created on the R1 to the R7, and passes through an SRv6 domain, which does not support MPLS, by using a BSID with an MPLS label form.

The specific segment list on R1 is {R2, R3, BSID1, R6, R7}.

Step S504: After received the data packet, R3 replaces BSID1 in the MPLS label form with SRv6 Policy which destination is R5, i.e., pushes in the SRH header of Segment-list as End. X of R4→R5 and End. DM SID of R5.

Because R3 stores the mapping relationship between the BSID1 in the MPLS label form and the SRv6 Policy which destination is R5, R3 can directly push the SRv6 Policy List which destination is R5 after knowing the BSID1.

End. DM represents the instructions "decapsulate the IPv6 header and its extension header, and the IPv6 header is an MPLS label, and perform MPLS label forwarding table lookup according to the MPLS label to forward a packet".

Step S506: After receiving the data packet, R5 determines that the destination address is R5 and executes the behavior of End. DM SID. Then, R5 decapsulates the IPv6 header and its extension header, knows that after the IPv6 header is an MPLS label, and perform the MPLS label forwarding table lookup according to the MPLS label to forward the packet to R6.

Embodiment 2

Figure 6:
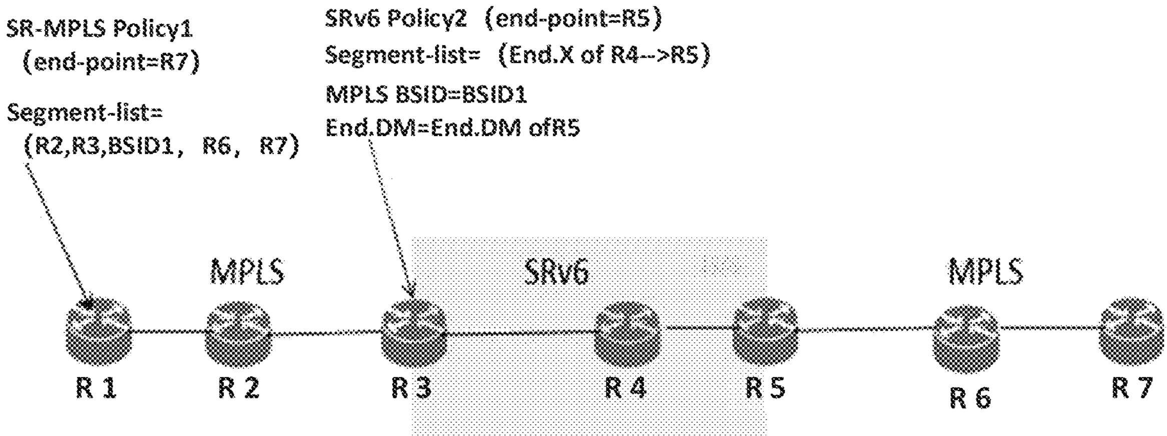
FIG. 6 is a schematic diagram of SR-policy information issued by a controller to an SR-policy header node according to an embodiment of the present disclosure.
Figures 7, 8:
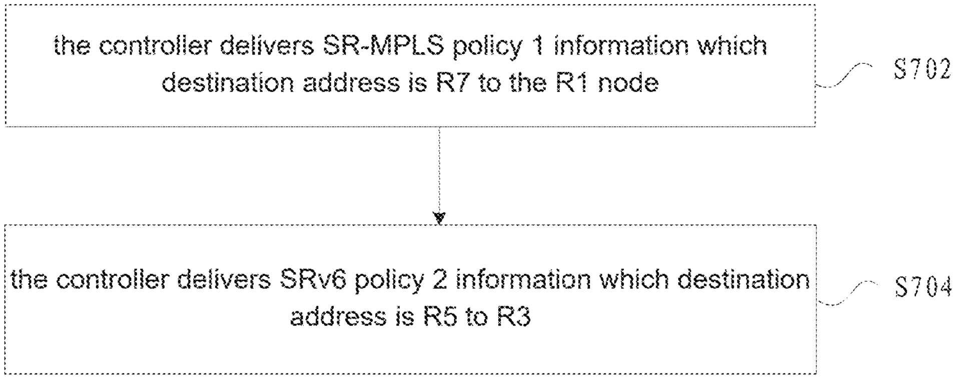
FIG. 7 is a flowchart of SR-policy information issued by a controller to an SR-policy header node according to an embodiment of the present disclosure.
FIG. 8 is a schematic diagram illustrating the data structure of an extended Sub-TLV according to an embodiment of the present disclosure.

FIG. 6 is a schematic diagram of SR-policy information issued by a controller to an SR-policy header node according to an embodiment of the present disclosure. In the SR-MPLS over SRv6 scenario shown in FIGS. 6, R1, R2 and R3 belong to the SR-MPLS network, R3, R4 and R5 belong to the SRv6 network, R5, R6 and R7 belong to the SR-MPLS network, R3 and R5 are border nodes and belong to the SR-MPLS and SRv6 networks at the same time. FIG. 7 is a flowchart of SR-policy information issued by a controller to an SR-policy header node according to an embodiment of the present disclosure. As shown in FIG. 7, the flow may include the following steps:

Step S702: The controller delivers SR-MPLS Policy1 information which destination address is R7 to the node R1.

The SR-NPLS Policy1 information with the destination address of R7 delivered by the controller to R1 may include:

SR-MPLS Policy 1 (end-point=R7);

segment-list=(R2, R3, BSID1, R6, R7).

Step S704: The controller delivers SRv6 Policy 2 information which destination address is R5 to R3, wherein the SRv6 Policy 2 is extended existing SR-Policy information by adding the behavior indication information of the R5 node.

the SRv6 Policy 2 information, which destination address is R5 and delivered by the controller to R3, may include:

SRv6 Policy2 (end-point=R5) segment-list=(End. x of R4→R5)

MPLS BSID=BSID1;

End. DM=End. DM of R5.

Embodiment 3

An SR-Policy tunnel attribute is defined in draft-ietf-idr-segment-routing-te-policy-09, and Sub-TLVs are defined in the SR-Policy tunnel attribute to carry related SR-Policy information. In this embodiment, an extended new Sub-TLV is: END. DM SID Sub-TLV, and the new Sub-TLV is used for identifying the forwarding behavior of the node. Specifically, a data structure of the END. DM SID Sub-TLV in this embodiment is shown in FIG. 8. As shown in FIG. 8, the Sub-TLV may include the following fields: type, length, Flags and Reserved, and IPv6 Node Address.

In the foregoing embodiment of the present disclosure, the SR-policy information received by the local node from the specific node carries the END. DM SID. Specifically, a new Sub-TLV: END. DM SID Sub-TLV is defined in the SR-Policy tunnel attribute to identify the forwarding behavior of the node.

When the specific node delivers the BGP SRv6 Policy to this node, the End. DM SID sub-TLV is extended, and this field carries the End. DM SID of the destination node of the SRv6 Policy.

Specifically, when the SRv6 Policy carries the BSID in an MPLS label form, the End. DM SID sub-TLV must be carried at the same time.

Specifically, after receiving the SRv6 Policy distributed by the BGP, if there are the BSID in the MPLS label form and the End. DM SID, the End. DM SID is stored in the table entry of the MPLS BSID.

Specifically, when the packet hits the entry label table item of the MPLS BSID, the IPv6 header and the SRH are encapsulated, and the End. DM SID is placed at the last hop of the SRH.

Embodiments of the present disclosure further provide a computer readable storage medium. The computer readable storage medium stores a computer program, when executed by a processor, the computer program is configured to cause the processor to execute the steps in any one of the method embodiments.

In an exemplary embodiment, the computer readable storage medium may include, but is not limited to, any medium that can store a computer program, such as a USB flash drive, a read-only memory (Read-Only Memory, ROM for short), a random access memory (Random Access Memory, RAM for short), a removable hard disk, a magnetic disk, or an optical disc.

An embodiment of the present disclosure also provides an electronic device, comprising a memory and a processor, wherein the memory stores a computer program, and the processor is configured to run the computer program so as to execute the steps in any of the described method embodiments.

In an exemplary embodiment, the electronic apparatus can further comprise a transmission device and an input/output device, wherein the transmission device is connected to the processor, and the input/output device is connected to the processor.

For specific examples in this embodiment, reference may be made to the examples described in the foregoing embodiments and exemplary embodiments, and details are not repeatedly described in this embodiment.

Obviously, those skilled in the art should understand that the described modules and steps of the present disclosure can be realized by a universal computing device, they may be centralized on a single computing device or distributed on a network composed of a plurality of computing devices, They can be implemented by program codes executable by a computing apparatus, and thus can be stored in a storage apparatus and executed by the computing apparatus. Furthermore, in some cases, the shown or described steps may be executed in an order different from that described here, or they are made into integrated circuit modules respectively, or a plurality of modules or steps therein are made into a single integrated circuit module for implementation. Thus, the present disclosure is not limited to any specific combination of hardware and software.

The above description is only the preferred embodiments of the present disclosure, and is not intended to limit the present disclosure. For those skilled in the art, the present disclosure may have various modifications and variations. Any modifications, equivalent replacements, improvements and the like made within the principle of the present disclosure shall belong to the protection scope of the present disclosure.

What is claimed is:

1. A packet forwarding method, comprising:

sending, by a source node in a first Segment Routing Multi-Protocol Label Switching (SR-MPLS) domain, a packet to a destination node in a second SR-MPLS domain based on a segment routing policy (SR-Policy), wherein an SR-Policy segment list of the packet comprises a Binding Segment Identifier (BSID) in an MPLS label form, for the packet passes through an SRv6 domain between the first SR-MPLS domain and the second SR-MPLS domain;

after receiving the packet, replacing, by a first border node, a BSID in an MPLS label form with an SRv6-Policy which destination address is a second border node, and forwarding the packet based on the SRv6-Policy, wherein the first border node is a border node between the first SR-MPLS domain and the SRv6 domain, and the second border node is a border node between the SRv6 domain and the second SR-MPLS domain;

after receiving the packet, decapsulating, the second border node, the IPv6 header and the extension header of the packet according to the behavior indication information carried in the SR-Policy, performing lookup in the MPLS label forwarding table according to the MPLS label, so as to forward the packet within the second SR-MPLS domain until the packet is forwarded to the destination node;

wherein before the source node sends the packet to the destination node based on the SR Policy, the method further comprises:

sending, by a controller, an SR-Policy which destination address is the destination node of the second SR-MPLS domain to the source node, wherein the SR-Policy comprises a SR-Policy segment list for reaching the destination node;

wherein before the source node sends the packet to the destination node based on the SR Policy information, the method further comprises:

sending, by the controller, the SRv6-Policy which destination address is the second border node to the first border node, the SRv6-Policy comprises the SRv6-Policy segment list for reaching the second border node and the behavior indication information Endpoint with Decapsulation and MPLS Table Lookup Segment Identifier (End. DM SID) of the second border node, the behavior indication information End. DM SID of the second border node refer to decapsulate the IPv6 header and the extension header of the IPv6 header, and perform MPLS label forwarding table lookup according to the MPLS label to forward the packet;

wherein the behavior indication information is a Sub-TLV defined in an SR-Policy tunnel attribute: End. DM SID Sub-TLV, and the End. DM SID Sub-TLV is used for identifying the forwarding behavior of the node, when a specific node sends a BGP SRv6 Policy to the node, End. DM SID sub-TLV is extended, and this field carries the End. DM SID sub-TL V of the SRv6 Policy destination node; when the SRv6 Policy carries the BSID in the MPLS label form, the End. DM SID Sub-TLV is also carried.

2. The method according to claim 1, wherein, the first border node replacing the BSID in the MPLS label form with an SRv6 Policy which destination address is the second border node comprises:

when the packet hits the MPLS BSID table entry, encapsulating, by the first border node, the packet with the IPv6 header and the Segment Routing Header (SRH), and carrying the End. DM SID in the last hop of the SRH.

3. The method according to claim 1, wherein decapsulating, by the second border node, the IPv6 header and the extension header of the packet after receiving the packet comprises:

after receiving the packet, and when the second border node found that the destination address of the packet is itself and needs to execute the behavior indicated by the behavior indication information, decapsulating, by the second border node, the IPv6 header and the extension header of the IPv6 header according to the behavior indicated by the behavior indication information End. DM SID, and performing an MPLS label forwarding table lookup according to the MPLS label to forward the packet.

4. The method according to claim 1, wherein when the controller sends the SRv6-Policy which destination address is the second border node to the first border node, the End. DM SID Sub-TLV identifying the forwarding behavior of the second border node is carried.

5. The method according to claim 4, wherein the method further comprises:

when the controller sends the SRv6-Policy which destination address is the second border node to the first border node, and the SRv6 Policy carries the BSID in the MPLS label form, the Extended. DM SID Sub-TL V is also carried.

6. The method according to claim 4, wherein the method further comprises:

after the first border node receives the sent SRv6 Policy, and when the BSID in the MPLS label form and the End. DM SID Sub-TLV exist, storing the End. DM SID Sub-TLV in the entry item of the MPLS BSID.

7. A non-transitory computer readable storage medium, wherein the computer readable storage medium stores a computer program, and the computer program is configured to, when executed by a processor, cause the processor to implement the steps of the method as claimed in claim 1.

8. An electronic device, comprising a memory, a processor, and a computer program stored on the memory and capable of running on the processor, wherein the processor is configured to execute the computer program to implement the steps of the method as claimed in claim 1.

9. An electronic device, comprising a memory, a processor, and a computer program stored on the memory and capable of running on the processor, wherein the processor is configured to execute the computer program to implement the steps of the method as claimed in claim 2.

10. An electronic device, comprising a memory, a processor, and a computer program stored on the memory and capable of running on the processor, wherein the processor is configured to execute the computer program to implement the steps of the method as claimed in claim 3.

11. A packet forwarding system, comprising: a source node in a first Segment Routing Multi-Protocol Label Switching (SR-MPLS) domain, a destination node in a second SR-MPLS domain, a first border node between the first SR-MPLS domain and an SRv6 domain, and a second border node between the SRv6 domain and a second SR-MPLS domain, wherein, the source node is configured to send a packet to the destination node based on a segment routing policy (SR-Policy), wherein an SR-Policy segment list of the packet comprises a Binding Segment Identifier (BSID) in an MPLS label form, so that the packet passes through an SRv6 domain between the first SR-MPLS domain and the second SR-MPLS domain;

the first border node is configured to, after receiving the packet, replace the BSID in the MPLS label form with an SRv6-Policy which destination address is the border node between the SRv6 domain and the second SR-MPLS domain, and forward the packet based on the SRv6-Policy;

the second border node is configured to, after receiving the packet, decapsulate an IPv6 header of the packet to obtain an MPLS label according to the behavior indication information carried in the SR-Policy, and forward the packet to the destination node according to the MPLS label;

wherein the system further comprises:

a controller, configured to issue to the source node an SR-Policy which destination address is a destination node of a second SR-MPLS domain, wherein the SR-Policy comprises a SR-Policy segment list for reaching the destination node;

wherein, the controller is further configured to issue the SRv6-Policy which destination address is the second border node to the first border node, the SRv6-Policy includes the SRv6-Policy segment list for reaching the second border node and the behavior indication information Endpoint with Decapsulation and MPLS Table Lookup Segment Identifier (End. DM SID) of the second border node, the behavior indication information End. DM SID of the second border node refer to decapsulate the IPv6 header and an extension header of the IPv6 header, and perform an MPLS label forwarding table lookup according to the MPLS label to forward the packet;

wherein the behavior indication information is a Sub-TLV defined in an SR-Policy tunnel attribute: End. DM SID Sub-TLV, and the End. DM SID Sub-TLV is used for identifying the forwarding behavior of the node, when a specific node sends a BGP SRv6 Policy to the node, End. DM SID sub-TLV is extended, and this field carries the End. DM SID sub-TL V of the SRv6 Policy destination node; when the SRv6 Policy carries the BSID in the MPLS label form, the End. DM SID Sub-TLV is also carried.

12. The system according to claim 11, wherein, the first border node is further configured to, when the packet hits the MPLS BSID table entry, encapsulate the packet with an IPv6 header and an Segment Routing Header (SRH), and place the End. DM SID in the last hop of the SRH.

13. The system according to claim 11, wherein, the second border node is further configured to, after receiving the packet, when the destination address of the packet is found to be itself and the behavior indicated by the behavior indication information needs to be executed, decapsulate the IPv6 header and the extension header according to the behavior indicated by the behavior indication information End. DM SID, and perform the MPLS label forwarding table lookup according to the MPLS label to forward the packet.

* * * * *